(12) United States Patent
Sedjelmaci (10) Patent No.: US 12,389,229 B2
(45) Date of Patent: Aug. 12, 2025

(54) MONITORING OF AT LEAST ONE SLICE OF A COMMUNICATIONS NETWORK USING A CONFIDENCE INDEX ASSIGNED TO THE SLICE OF THE NETWORK

(71) Applicant: Orange, Issy-les-Moulineaux (FR)

(72) Inventor: Hichem Sedjelmaci, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 241 days.

(21) Appl. No.: 18/002,149

(22) PCT Filed: Jun. 18, 2021

(86) PCT No.: PCT/FR2021/051109
§ 371 (c)(1),
(2) Date: Dec. 16, 2022

(87) PCT Pub. No.: WO2021/255400
PCT Pub. Date: Dec. 23, 2021

(65) Prior Publication Data
US 2023/0232235 A1    Jul. 20, 2023

(30) Foreign Application Priority Data

Jun. 19, 2020 (FR) .................................. 2006453
Jun. 19, 2020 (FR) .................................. 2006454

(51) Int. Cl.
*H04L 29/00* (2006.01)
*H04W 12/122* (2021.01)

(52) U.S. Cl.
CPC ................... *H04W 12/122* (2021.01)

(58) Field of Classification Search
CPC ............. H04W 12/122; H04W 12/121; H04L 63/1433
See application file for complete search history.

(56) References Cited

U.S. PATENT DOCUMENTS 11,095,533 B1 * 8/2021 Hermoni ............... H04L 43/067
2005/0039047 A1   2/2005 Raikar et al.
(Continued)

FOREIGN PATENT DOCUMENTS

CN         105516177 B    2/2019
WO     WO 2019/115173 A1  6/2019

OTHER PUBLICATIONS

International Search Report and Written Opinion dated Sep. 1, 2021 for Application No. PCT/FR2021/051109.
(Continued)

*Primary Examiner* — Ghazal B Shehni
(74) *Attorney, Agent, or Firm* — Knobbe, Martens, Olson & Bear, LLP (57) ABSTRACT

A monitoring system is described for monitoring at least one slice of a communications network using at least one access network, an edge network and a core network. The system, comprises, for each slice, a plurality of intrusion detection modules configured to monitor elements associated with said section and comprising at least a first module for detecting intrusions at the access network level, a second module for detecting intrusions at the edge network level, and at least a third module at the core network level, each of the modules being configured to provide a piece of information representative of a local confidence level assigned to the section according to a behaviour of at least one element that it monitors. One of the third modules is additionally configured to evaluate, from the provided information, an overall confidence level for this section and to trigger an intrusion mitigation action for this section depending on the value of this overall confidence level.

12 Claims, 3 Drawing Sheets

(56) References Cited

U.S. PATENT DOCUMENTS

2017/0279848 A1* 9/2017 Vasseur ................ H04W 12/02
2022/0361188 A1* 11/2022 Sun ..................... H04B 7/0695

OTHER PUBLICATIONS

Liu, et al., "A Dynamic Composition Mechanism of Security Service Chaining Oriented to SDN/NFV—Enabled Networks" IEEE Access, vol. 6. Sep. 17, 2018 (Sep. 17, 2018), pp. 53918-53929.

* cited by examiner

MONITORING OF AT LEAST ONE SLICE OF A COMMUNICATIONS NETWORK USING A CONFIDENCE INDEX ASSIGNED TO THE SLICE OF THE NETWORK

PRIOR ART

The invention relates to the general field of telecommunications and more particularly to the security of communications networks and the protection of the latter from computer attacks, also commonly referred to as cyber attacks.

The preferred, but non-exclusive, application of the invention is to 5G (5th Generation) networks, and notably to 5G wireless networks based on architectures using a technique of dividing network into slices, more commonly referred to as "network slicing".

The architecture of wireless telecommunications networks currently deployed or in the course of deployment is defined by the standardization group known as 3GPP (Third Generation Partnership Project). This is the case, notably, for wireless networks known as second generation (2G or GSM), third generation (3G), or fourth generation (4G) networks.

Up to the fourth generation, network architectures defined by the 3GPP group are most commonly based on specific equipment dedicated to precise functionalities, at the access network or core network level, notably in relation to the transmission of packets to or from a mobile terminal.

The lack of flexibility and evolutivity inherent in this type of architecture led the 3GPP group to consider the adoption of more flexible architectures for the next generation of wireless networks, called "5G", to allow a rapid response to highly diverse requirements in terms of traffic and/or quality of service envisaged by 5G networks (including the Internet of Things, or IoT, broadband access in dense networks, etc.). It should be noted that 5G networks are intended to include both mobile and fixed networks.

One of the most promising solutions among those considered is based on a technique of dividing the network into slices, a.k.a "network slicing". This technique is described, notably, in 3GPP technical specification TS 23.501 v 15.7.0, September 2019. It enables the operator of a network to create independent, custom-designed end-to-end logical networks for its clients, based on the same physical network infrastructure (access network(s), core network, etc.) and capable of providing optimized solutions for various scenarios corresponding to different constraints in terms of functionality, performance and quality of service.

More specifically, the network slice concept makes it possible to create a plurality of network instances, also called network slices. A network slice is composed of network functions, hardware resources (for storage, calculation, access, etc., for example) and configurations designed to meet requirements relating to the services, clients and/or terminals connected to this slice.

Figure 1:
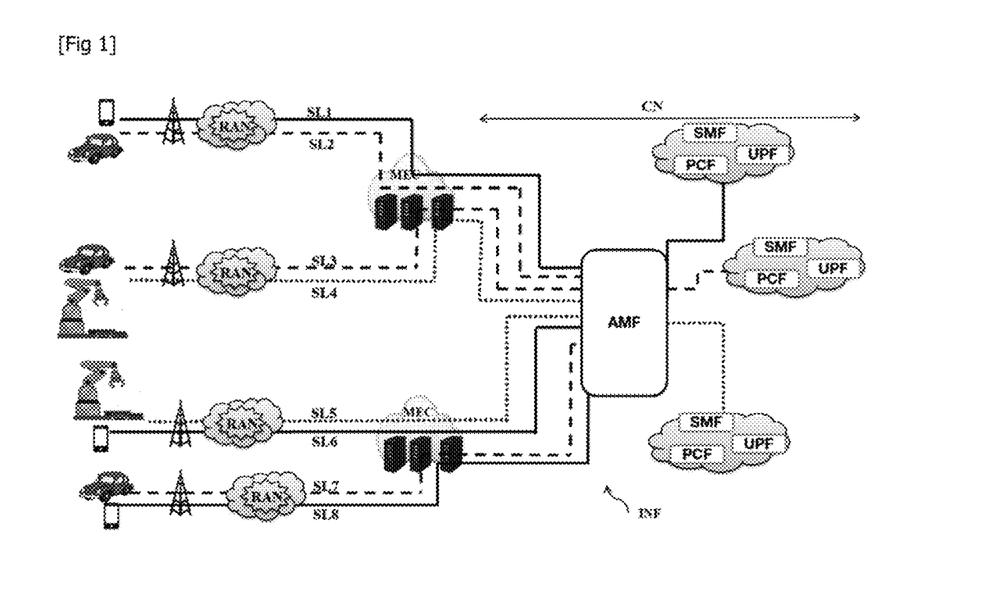

By way of illustration, FIG. 1 shows a simplified view of a communications infrastructure INF comprising eight network slices SL1, SL2, . . . , SL8, each representing a wireless network, the network slices sharing access network infrastructures RAN (for "Radio Access Network"), edge network infrastructures MEC (for "Multiple-Access Edge Computing"), and virtual network functions or groups of virtual network functions implemented in the core network CN. Such virtual network functions include, for example, routing, addressing, data flow control, naming and other functions. In the example of FIG. 1, the network slices SL1 to SL8 share, by way of illustration, functions of the core network CN comprising, notably, access and mobility management functions AMF, session management functions SMF, user plane functions UPF, and policy charging functions PCF.

The various network slices SL1, . . . , SL8 may provide access to separate data networks or to the same data network. Each network slice may be attached to a separate wireless network, and is determined by the features of the data flows through this network slice, which have common points in terms of destination, routing and security constraints, for example, allowing common management within the same network slice. Each of the slices is thus optimized for the requirements of one type of service and/or one type of client and/or terminals. A single terminal may be connected to different network slices.

In this context of network slicing, due notably to the advanced communication techniques used and the new capacity offered in terms of speed, information volume and connection, 5G wireless networks open up unprecedented possibilities for use, which pose real challenges in terms of cyber security.

The paper by Y. Khettab et al., "Virtual Security as a Service for 5G Verticals", WCNC 2018, IEEE Wireless Communications and Networking Conference, proposes an architecture using the concepts of network function virtualization and software defined networking (SDN) for securing a network slice on demand. This architecture is based on the dynamic deployment in each network slice of a plurality of virtual functions including intrusion detection services (IDS) and deep packet inspection (DPI), the monitoring of their performance, and the dynamic adaptation of the number of functions deployed taking into account predefined policies and metrics.

Thus the architecture proposed in this paper helps to satisfy the constraints of flexibility and elasticity imposed on 5G networks, while ensuring the optimal allocation of the resources dedicated to security protection of the network slice concerned. However, due notably to the individual management of each IDS/DPI security function deployed, its efficacy in terms of security in case of a massive cyber attack against the network may prove to be inadequate (notably as regards the rate of false negatives detected).

Consequently there is a need for an architecture adapted to the network slicing approach that is highly valued, notably, in 5G networks, while offering better security protection of the network against the threat of cyber attacks.

SUMMARY OF THE INVENTION

The invention responds to this need, notably, by proposing, according to a first aspect, a system for monitoring at least one slice of a communications network using at least an access network, an edge network and a core network, comprising, for each slice, a plurality of intrusion detection modules configured to monitor elements associated with said slice and comprising at least a first module for detecting intrusions at the access network level, a second module for detecting intrusions at the edge network level, and at least a third module at the core network level, each of said modules being configured to provide a piece of information representative of a local confidence level assigned to said slice according to a behavior of at least one element that it monitors, a said third module also being configured to evaluate, from the provided information, a global confidence level for said slice and to trigger an intrusion mitigation action for said slice according to a value of this global confidence level.

In correlation, the invention also proposes a method for monitoring at least one slice of a communications network using at least an access network, an edge network and a core network, said method comprising:
- a step of monitoring said slice by means of a plurality of intrusion detection modules configured to monitor elements associated with said slice and comprising at least a first module for detecting intrusions at the access network level, a second module for detecting intrusions at the edge network level, and at least a third module at the core network level;
- a step of providing, by means of each of said modules, a piece of information representative of a local confidence level assigned to said slice according to a behavior of at least one element monitored by said module;
- a step of evaluating, by means of a said third module, from said information provided, a global confidence level for said slice; and
- a step of triggering an intrusion mitigation action for said slice according to a value of this global confidence level.

No limits are imposed on the intrusion detection techniques used by the different intrusion detection modules involved in the implementation of the invention: such techniques may be simple anomaly detection techniques based on predefined normal behavior models, techniques based on predefined rules and/or signatures characterizing various known cyber attacks, automatic learning (or "machine learning") techniques, supervised or unsupervised, hybrid detection techniques using a combination of the aforesaid techniques, or others. Neither are any limits imposed on the kind of intrusion that may affect the network: such intrusions may be of the distributed denial of service (or "DDoS"), interference with communications (or "jamming"), or other types.

Thus the invention proposes an architecture based on the deployment of a plurality of intrusion detection modules at various levels of each network slice (access network, edge network, core network), and on the collaboration of these detection modules for estimating a global confidence index for each network slice, the value of this global confidence index being taken into account for triggering an intrusion mitigation action at the level of said slice if necessary.

Such an action is, for example, if the value of the global confidence level is below a given threshold, the isolation of this slice of the network and/or the removal of at least one element of the access network, of the edge network and/or of the core network identified as being targeted by an intrusion. Evidently, these examples of mitigation actions are given purely by way of illustration, and other mitigation actions may be envisaged, according to, notably, the nature of the intrusion detected, the value of the confidence level, the seriousness of the intrusion, information on anomalies uploaded by the various intrusion detection modules, the element(s) targeted by the intrusion, etc.

Thus, by operating in a distributed manner on different levels of the network infrastructure on which each network slice is based, and as a result of the proposed collaboration between the different detection modules, the invention makes it possible to limit the rate of false detections (false negatives and/or false positives) of each detection module, and to improve the overall security of the network slices by comparison with the prior art. The security protection of each slice is ensured from end to end of the network, from the user terminal to the core network: the invention does not simply secure the access network or the core network, but monitors each part of the network for each slice concerned. This results in stronger security for the various network slices.

By evaluating a global confidence index for the slice, it is also possible to determine how the slice is affected by the intrusion(s) detected if necessary, and to trigger a suitable response. This global confidence index is advantageously evaluated in the most secure part of the network, that is to say the core of the network, according to information collected in a distributed manner in the network over different segments of the network. This enables a robust and reliable confidence index to be provided.

The detection modules may also advantageously be configured to exchange information with each other concerning the intrusions detected by them in the network slice, enabling any module to benefit from the detections performed by the other detection modules, while also updating their knowledge about these intrusions. This "horizontal" collaboration within the same slice, in the upward direction (from the access network to the core network) and/or the downward direction (from the core network to the access network) can improve the speed and accuracy of the execution of the detections performed by the detection modules.

In a particular embodiment, the plurality of detection modules associated with said slice comprises a plurality of third modules associated, respectively, with separate active network functions of the core network.

In this embodiment, a detection module is advantageously deployed at the level of a plurality of network functions provided by the core network and activated for the slice concerned (for example, one detection module for each active network function). In fact, not all the network functions present at the core network level are necessarily activated at a given instant and for a given service. This embodiment makes it possible to provide effective protection for said active network functions, and notably the most critical functions for a given slice, such as the aforementioned AMF, UPF, and PCF in the context of a 5G network.

In a variant, it may be envisaged that the same intrusion detection module could be configured to monitor a plurality of active network functions simultaneously.

As regards the first and second modules, it would be possible, for example, to consider using an intrusion detection module deployed at the access network level (and capable of monitoring the various entities of this access network or those connected to the access network), and an intrusion detection module deployed at the edge network level (and capable of monitoring the various entities of this edge network). Evidently, a configuration with more first and second modules may be envisaged.

It should also be noted that a single detection module, regardless of the part of the network at the level of which it is deployed, may be used to monitor a plurality of network slices simultaneously.

In the embodiment in which a plurality of third modules is deployed at the level of various active network functions of the core network for said slice, the third module configured for evaluating the global confidence level of a slice may be selected from among these third modules, for example according to its proximity to the edge network(s) and to the access network(s) used by said slice.

This limits the risks of attacks during the transfer of information between the modules at the level of the access network(s) and of the edge network(s) and this third module. Such a module, in the example of a 5G network, is, for example, an intrusion detection module embedded in an AMF or PCF function of the core network.

According to the invention, the global index evaluated for one slice is calculated according to the local indices uploaded by the first, second and third detection modules. In a particular embodiment, the global confidence level for one slice is, for example, a mean of the local confidence levels provided by said plurality of detection modules.

The local confidence levels are assessed by the detection modules distributed in the network over each slice concerned, according to the anomalies that they observe. Different ways of evaluating such a local confidence level may be envisaged.

For example, in a particular embodiment, at least one local confidence level is evaluated by one said detection module for one said slice as a ratio between a subtraction of a number of normal behaviors of said at least one element monitored by this detection module and of a number of intrusions affecting said at least one element monitored by this detection module detected over a given period of time, by a sum of said numbers.

Such a local confidence level is easily evaluated by the detection module concerned, on the basis of the monitoring that it carries out at the level where it is deployed. However, other ways of evaluating a local confidence level for the slice may be envisaged. For example, the local confidence index may be calculated on the basis of a weighted sum of the two aforesaid numbers, or simply one of them, etc.

In a particular embodiment, said first module is configured so that, on detecting an intrusion, it signals said detected intrusion to said second module and/or to a said first module associated with another slice using said access network.

This embodiment proposes collaboration between the detection modules on a horizontal plane as discussed above, in other words between detection modules deployed on the same network slice, and/or on a vertical plane, that is to say between detection modules deployed at the levels of different network slices but using the same access network. Consequently other slices of the network, using the same physical infrastructure, can benefit from the information on intrusions detected at the level of this infrastructure, for example the characteristics (or "features") of these intrusions and their signatures (or "patterns"), with the aim of enriching the knowledge of the detection modules associated with these other slices. This improves the accuracy of detection and the reactivity of the detection modules against an attack deployed at the access network level, and, where relevant, the efficiency of the mitigation actions implemented in response to this attack.

The security of the network is thus improved, which benefits the various network slices using the access network concerned.

In a particular embodiment, the second module is configured so that, on detecting an intrusion, it signals said detected intrusion to said at least one third module and/or triggers a mitigation action at the level of the access network and/or of the edge network.

The information on the detected intrusions is thus uploaded to the core network, enabling the core network to have an overall view of intrusions targeting the elements of the network slice.

Furthermore, a mitigation action may be triggered rapidly as closely as possible to the elements targeted by the intrusion (i.e. at the level of the access network and/or the edge network), and can combat the intrusion more effectively.

Each detection module, regardless of the segment of the network where it is deployed, may be configured to execute a certain number of predetermined actions, these including not only the monitoring of the segment of the network on which it is deployed, as would be expected, but also the deep analysis of the traffic when an intrusion is suspected, the notification of the other detection modules to alert them to the detection of an intrusion, the triggering of mitigation actions, etc. These "logical" actions are configurable and may vary according to the segment where the module in question is deployed (depending on whether it is a first, second or third module in the sense of the invention), and also according to other factors, such as the network slice where it is deployed and its sensitivity in terms of security, etc.

For example, in a particular embodiment, at least one said detection module is configured to execute at least one action from among a deep traffic analysis action, a notification action, and/or a mitigation action when it detects that a probability of executing this action is above a specified threshold.

This threshold may be determined by experts, may be fixed, or may vary according to the actions, etc.

In a variant, it may be determined dynamically for and by said detection module, for example on the basis of a number of false detections performed by the module, using a machine learning algorithm for example.

It should be noted that the concept of a false detection is assessed here in relation to a validation of the detected intrusions performed at the core network level (by a third module in the sense of the invention, for example).

Such a dynamic adaptation of the threshold makes it possible to take into account, advantageously, the changing environment of cyber attacks, in which the features may evolve rapidly or new attacks may appear, as well as the performance of the detection module. Evidently, the threshold adaptation may be based on other criteria.

The invention also proposes a communications network configured to implement network slicing, said communications network comprising a monitoring system according to the invention for monitoring at least one slice of said network.

The network benefits from the same aforementioned advantages as the monitoring system according to the invention.

In other embodiments, it would also be feasible for the monitoring method, the monitoring system and the network according to the invention to have all or some of the aforesaid features in combination.

According to a second aspect, the invention proposes a system for monitoring at least one slice of a communications network using at least an access network, an edge network and a core network, said system comprising, for each slice, a plurality of intrusion detection modules configured to monitor elements associated with said slice and comprising at least a first module for detecting intrusions at the access network level, a second module for detecting intrusions at the edge network level, and at least a third module at the core network level, said detection modules also being configured to exchange between them information on the detected intrusions affecting elements that they monitor, and at least one said detection module being configured to execute at least one action from among an action of deep analysis of at least one anomaly detected on an element that it is monitoring, an action of aggregating and/or correlating information received from at least one said detection module, an action of notifying a said detection module of a detected intrusion, and/or an action of mitigating an intrusion when it determines that a probability of executing said action is above a given threshold.

In correlation, the invention also proposes a method for monitoring at least one slice of a communications network using at least an access network, an edge network and a core network, said method comprising:

a step of monitoring said slice by means of a plurality of intrusion detection modules configured to monitor elements associated with said slice and comprising at least a first module for detecting intrusions at the access network level, a second module for detecting intrusions at the edge network level, and at least a third module at the core network level, said detection modules also being configured to exchange between them information on detected intrusions affecting elements that they are monitoring;

a step of determining at least one probability of executing at least one action from among an action of deep analysis of at least one anomaly detected on an element that it is monitoring, an action of aggregating and/or correlating information received from at least one said detection module, an action of notifying a said detection module of a detected intrusion, and/or an action of mitigating an intrusion; and a step of executing said action if said probability of executing said action is above a given threshold.

The various intrusion detection modules involved in the implementation of the invention may use various types of intrusion detection techniques. For example, they may use a simple anomaly detection technique (based on a model of normal behavior, for example) combined with a more advanced detection technique of deep analysis of the anomalies detected where relevant, for example a technique based on predefined rules and/or on signatures characterizing known cyber attacks, an automatic learning (or "machine learning") technique, supervised or unsupervised, or other techniques. It should be noted that there are no limits regarding the kind of intrusion that may affect the network: such intrusions may include distributed denial of service (or "DDoS"), interference in communications (or "jamming"), or other types.

Thus, according to this second aspect, the invention proposes a distributed architecture based on the deployment of a plurality of intrusion detection modules at different levels of the network (access network, edge network, core network) enabling each network slice to be monitored from end to end. These detection modules are advantageously configured to exchange information with each other concerning the intrusions detected by them in the network slice, enabling any module to benefit from the detection performed by the other detection modules, while also updating their knowledge about these intrusions. This "horizontal" collaboration within the same slice, in the upward direction (from the access network to the core network) and/or the downward direction (from the core network to the access network) can improve the speed and accuracy of the execution of the detections performed by the detection modules.

Each detection module, regardless of the segment of the network where it is deployed, may be configured to automatically execute a certain number of predetermined logical actions, these including not only the monitoring of the segment of the network on which it is deployed, as would be expected, but also the deep analysis of the traffic when an intrusion is suspected, the notification of the other detection modules to alert them to the detection of an intrusion, the aggregation and/or correlation of information received from other detection modules, the triggering of mitigation actions, etc. These actions are configurable at the level of each detection module, and may vary according to the segment where the module in question is deployed (depending on whether it is a first, second or third module in the sense of the invention), and also according to other factors, such as the network slice where it is deployed and its sensitivity in terms of security, etc.

According to the invention in its second aspect, such an action is executed by a detection module when the latter determines that a probability of executing this action is above a given threshold. This probability may be evaluated, periodically for example, by the detection module, or in response to a particular event detected by the detection module.

The threshold associated with an action may be determined by experts, may be fixed or dynamic, or may vary according to the actions, etc. By taking such a threshold into account, it is possible to economize on the resources of the network and of each detection module, to improve the performance of the network (in terms of quality of service (QoS), latency and/or "overheads", for example) and to limit the complexity of the monitoring system proposed by the invention: the aforesaid actions are executed by the detection module only when they are considered necessary in view of the thresholds specified for these actions. Thus, while the invention is based on the deployment of a plurality of detection modules in different segments of each network slice to provide effective monitoring of this network slice, the complexity resulting from this distributed deployment and the exchanges specified between the detection modules is compensated for by limiting the actions executed by these modules in the context of this monitoring (notably when no attack is taking place), and triggering the execution of these actions only when they are considered to be useful and necessary to ensure the security of the network.

The invention therefore offers a compromise between security and quality of service, and provides a high-performance solution, efficient in terms of resources, for securing a network that uses a network slicing technique.

In a particular embodiment, the threshold triggering the execution of an action is determined dynamically for and by said detection module by means of a machine learning algorithm.

For example, it may be determined on the basis of at least one parameter from among:

a number of false detections of said detection module (the concept of a false detection may be assessed, for example, in relation to a validation of the detected intrusions performed at the core network level by a third module in the sense of the invention, for example, or by a trusted entity such as a security operations center (SOC);

a number of intrusions detected by said detection module;

at least one type of intrusion detected by said detection module;

at least one type of element monitored by said detection module.

However, this list of parameters is not limiting, and other parameters could be taken into account for the dynamic determination of the threshold.

Such a dynamic adaptation of the threshold makes it possible to take into account, advantageously, the changing environment of cyber attacks (intrusions), in which the features of the intrusions may develop rapidly or new intrusions may appear, as well as the changing environment of the network slices (changes in the resources assigned to a network slice, etc.). In the presence of such a changeable environment, the inventor has found that a dynamically fixed threshold is a more effective means of ensuring network security. This particular embodiment of the monitoring system according to the invention is therefore particularly suitable for a dynamic network such as a 5G network using a technique of network slicing.

Furthermore, the adaptation of the threshold according to the aforesaid parameters also enables the performance of the detection module to be improved, since it takes into account parameters indicative of this performance (the number of false detections, for example).

In a particular embodiment, the machine learning algorithm is a Q-learning algorithm.

A machine learning algorithm is particularly effective for monitoring the changes in the environment in which the detection module is deployed. In a way that is known to those skilled in the art, the Q-learning algorithm has the advantage of requiring no initial knowledge of the environment in which it is used. Other machine learning algorithms, such as a support vector machine (SVM), may be envisaged by way of variants.

It should be noted that the machine learning algorithm may be applied to each threshold individually, or, if the detection module is configured to execute a plurality of actions, each dependent on a threshold, the thresholds may be determined jointly by means of said machine learning algorithm. This makes it possible to take the various constraints of the network into account simultaneously, not simply in terms of security but also in relation to quality of service and complexity (latency, overheads, etc.).

In a particular embodiment, the Q-learning algorithm is a recursive algorithm comprising, on each iteration, evaluation of a utility function and a reward function, said utility function indicating an effect of an update of said threshold in a preceding iteration on a detection performance of said detection module, a value of said reward function being increased in said iteration if a value of said utility function for said iteration is greater than a value of said utility function in a preceding iteration and/or if an update of said threshold enables said detection module to detect a new type of intrusion, and being decreased otherwise.

This embodiment enables the threshold to be updated in order to improve the precision of the detection carried out by the detection module.

In a particular embodiment, the plurality of detection modules associated with said slice comprises a plurality of third modules associated, respectively, with separate active network functions of the core network.

In this embodiment, a detection module is advantageously deployed at the level of a plurality of network functions provided by the core network and activated for the slice concerned (for example, one detection module for each active network function). In fact, not all the network functions present at the core network level are necessarily activated at a given instant or for a given service. This embodiment makes it possible to provide effective protection for said active network functions, and notably the most critical functions for a given slice, such as the aforementioned AMF, UPF, and PCF in the context of a 5G network.

In a variant, it may be envisaged that the same intrusion detection module is configured to monitor a plurality of active network functions simultaneously.

As regards the first and second modules, it would be possible, for example, to consider using an intrusion detection module deployed at the access network level (and capable of monitoring the various entities of this access network or those connected to the access network), and an intrusion detection module deployed at the edge network level (and capable of monitoring the various entities of this edge network). Evidently, a configuration with more first and second modules may be envisaged.

It should also be noted that a single detection module, regardless of the part of the network at the level of which it is deployed, may be used to monitor a plurality of network slices simultaneously. In other words, the invention makes use of collaboration between the detection modules on a horizontal plane.

According to the invention, the detection modules deployed to monitor the same network slice are configured to exchange between them information on the intrusions that they have detected and that affect the elements that they are monitoring.

In a particular embodiment, said first module is configured so that, on detecting an intrusion, it signals said detected intrusion to said second module and/or to a said first module associated with another slice using said access network.

In other words, as well as collaboration on the horizontal plane, this embodiment offers the possibility of collaboration on a vertical plane, that is to say between detection modules deployed at the levels of different network slices but using the same access network. Consequently other slices of the network, using the same physical infrastructure, can benefit from the information on intrusions detected at the level of this infrastructure, for example the characteristics (or "features") of these intrusions and their signatures (or "patterns"). This improves the accuracy of detection and the reactivity of the detection modules against an attack deployed at the access network level, and, where relevant, the efficiency of the mitigation actions implemented in response to this attack.

The security of the network is thus improved, which benefits the various network slices using the access network concerned.

In a particular embodiment, the second module is configured so that, on detecting an intrusion, it signals said detected intrusion to said at least one third module and/or triggers a mitigation action at the level of the access network and/or of the edge network.

The information on the detected intrusions is thus uploaded to the core network, enabling the core network to have an overall view of intrusions targeting the elements of the network slice.

Furthermore, a mitigation action may be triggered rapidly as closely as possible to the elements targeted by the intrusion (i.e. at the level of the access network and/or the edge network), and can combat the intrusion more effectively.

In a particular embodiment, the third module is configured to signal said detected intrusion to said first and/or said second detection module, and/or to trigger a mitigation action in the network.

This enables the first and second detection modules to benefit from the more advanced knowledge of the third module concerning intrusions affecting the network, because the third module is located in the core network and benefits from a more global view of the network, supported by uploads of information from the various detection modules deployed in the access network and in the edge network.

In a particular embodiment, each of said detection modules is configured to provide a piece of information representative of a local confidence level assigned to said slice according to a behavior of at least one element that it monitors, a said third module also being configured to evaluate, from the provided information, a global confidence level for said slice and to trigger an intrusion mitigation action for said slice according to a value of this global confidence level.

This embodiment makes use of the collaboration of these detection modules for estimating a global confidence index for each network slice, the value of this global confidence index being taken into account for triggering an intrusion mitigation action at the level of said slice if necessary.

Such an action is, for example, if the value of the global confidence level is below a given threshold, the isolation of this slice of the network and/or the removal of at least one element of the access network, of the edge network and/or of the core network identified as being targeted by an intrusion. Evidently, these examples of mitigation actions are given purely by way of illustration, and other mitigation actions may be envisaged, according to, notably, the nature of the intrusion detected, the value of the confidence level, the seriousness of the intrusion, information on anomalies uploaded by the various intrusion detection modules, the element(s) targeted by the intrusion, etc.

Thus, by operating in a distributed manner on different levels of the network infrastructure on which each network slice is based, and as a result of the proposed collaboration between the different detection modules, the invention makes it possible to limit the rate of false detections (false negatives and/or false positives) of each detection module, and to improve the overall security of the network slices by comparison with the prior art. The security protection of each slice is ensured from end to end of the network, from the user terminal to the core network: the invention does not simply secure the access network or the network core, but monitors each part of the network for each slice concerned. This results in stronger security for the various network slices.

By evaluating a global confidence index for the slice, it is also possible to determine how the slice is affected by the intrusion(s) detected if necessary, and to trigger a suitable response. This global confidence index is advantageously evaluated in the most secure part of the network, that is to say the core network, according to information collected in a distributed manner in the network over different segments of the network. This enables a robust and reliable confidence index to be provided.

According to the invention, the global index evaluated for one slice is calculated according to the local indices uploaded by the first, second and third detection modules. In a particular embodiment, the global confidence level for one slice is, for example, a mean of the local confidence levels provided by said plurality of detection modules.

The local confidence levels are assessed by the detection modules distributed in the network over each slice concerned, according to the anomalies that they observe. Different ways of evaluating such a local confidence level may be envisaged.

For example, in a particular embodiment, at least one local confidence level is evaluated by one said detection module for one said slice as a ratio between a subtraction of a number of normal behaviors of said at least one element monitored by this detection module and of a number of intrusions affecting said at least one element monitored by this detection module detected over a given period of time, by a sum of said numbers.

Such a local confidence level is easily evaluated by the detection module concerned, on the basis of the monitoring that it carries out at the level where it is deployed. However, other ways of evaluating a local confidence level for the slice may be envisaged. For example, the local confidence index may be calculated on the basis of a weighted sum of the two aforesaid numbers, or simply one of them, etc.

In the embodiment in which a plurality of third modules is deployed at the level of various active network functions of the core network for said slice, the third module configured for evaluating the global confidence level of a slice may be selected from among these third modules, for example according to its proximity to the edge network(s) and to the access network(s) used by said slice.

This limits the risks of attacks during the transfer of information between the modules at the level of the access network(s) and of the edge network(s) and this third module. Such a module, in the example of a 5G network, is, for example, an intrusion detection module embedded in an AMF or PCF function of the core network.

The invention also proposes a communications network configured to implement network slicing, said communications network comprising a monitoring system according to the invention for monitoring at least one slice of said network.

The network benefits from the same aforementioned advantages as the monitoring system according to the invention.

In other embodiments, it would also be feasible for the monitoring method, the monitoring system and the network according to the invention to have all or some of the aforesaid features in combination.

BRIEF DESCRIPTION OF THE DRAWINGS

Other characteristics and advantages of the present invention will be apparent from the following description, with reference to the attached drawings which illustrate a non-limiting example of embodiment of the invention. In the figures, FIG. 1, described above, shows a network using a network slicing technique.

DESCRIPTION OF THE INVENTION

Figure 2:
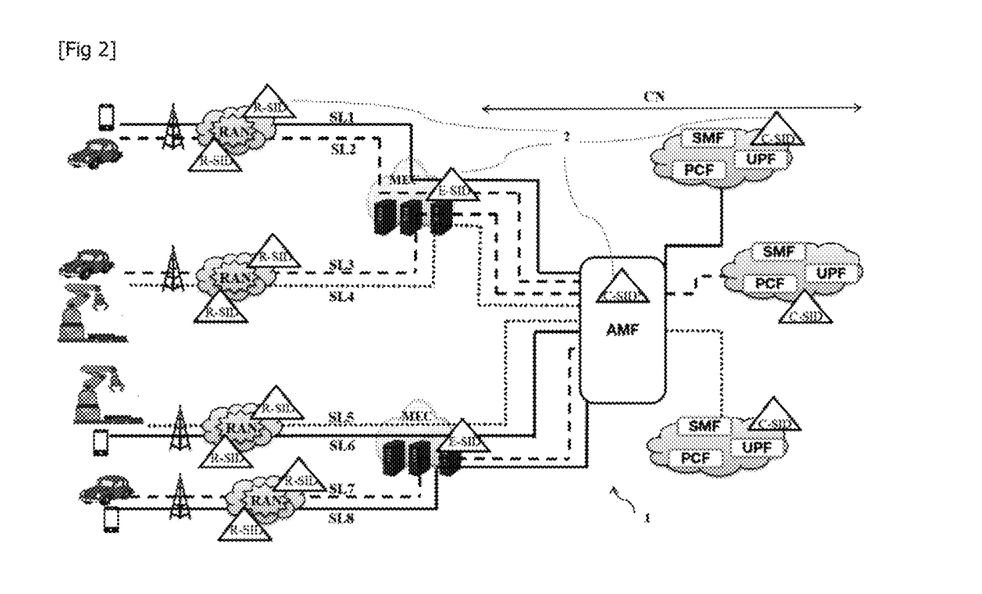
FIG. 2 shows a network according to the invention in its environment, in a particular embodiment.

FIG. 2 shows a communications network 1 according to the invention, in a particular embodiment.

In this case, the communications network 1 is, for example, a 5G network using a network slicing technique.

In a known way, a plurality of separate access networks may be used for accessing the core of a 5G network. There are no limits here on the number or on the technology or technologies used by these access networks (GSM, UMTS, LTE, WLAN, etc.).

It is also assumed here that the network 1 uses what is known as an "edge computing" strategy. This technology, based here on the MEC (Multi-access Edge Computing) standard, consists in transferring the analysis, processing and storage of certain data and/or applications to the edge of the network (in what is known as an edge network), rather than performing these tasks in data centers or in a cloud which may be located several thousand kilometers from the sources of these data and/or applications. By means of this decentralized processing nearer the sources of the data and/or applications, it is advantageously possible to optimize the bandwidth requirements, to limit the transmission of numerous data and/or applications to data centers or to the cloud (incidentally limiting the security leaks and/or problems that may arise from this transmission), and to provide a degree of fluidity and rapid reaction. This limits the latency and delays associated with the processing of data and/or applications, and offers real time performance, notably for broadband applications. This results in a better user experience.

Evidently, therefore, the use of such an edge network is of particular benefit in the context of 4G and 5G communications networks, and of the Internet of Things (IoT), which has witnessed an exponential growth of traffic and an explosive increase in the number of objects connected to networks.

In the example shown in FIG. 2, eight network slices SL1, SL2, . . . , SL8, each representing a wireless network, and based on the infrastructure of the communications network 1, are considered. More particularly, the network slices share access network infrastructures (denoted RAN in the figure), edge network infrastructures (denoted MEC in the figure), and virtual network functions or groups of virtual network functions of the core network (CN) of the communications network 1. Such virtual network functions include, for example, routing, addressing, data flow control, naming and other functions. In the example of FIG. 2, we consider more particularly the virtual network functions AMF, SMF, UPF and PCF mentioned above.

To secure the network 1, and more particularly each network slice SL1, . . . , SL8 of the network 1, the network comprises, according to the invention, a monitoring system 2 comprising a plurality of intrusion detection modules deployed at the level of each network slice, and configured to monitor what are known as "target" elements associated with this slice. In the embodiment described here, each intrusion (or cyber attack) detection module is a software module, denoted in a general way by SID (for Software Intrusion Detection). There is no limit on the kind of techniques used by the intrusion detection modules SID for monitoring the target elements attached to them. Here, "intrusions" is taken to mean computer attacks or cyber attacks capable of affecting various resources of the network 1 (for example, calculation resources, servers, memory resources, etc.), where these attacks may originate from attackers inside or outside the network 1. It should be noted that the attacks in question may target the resources of the network 1 directly; alternatively, these resources may be the indirect victims of attacks.

In a particular embodiment, the detection of such attacks may be based equally well on the detection of anomalies relative to a normal behavior defined in advance using a model (or "pattern"), or on the consideration of rules and/or signatures defining, for known attacks, a certain number of features of the network that are symptomatic of these attacks, or on supervised or unsupervised learning algorithms, or on hybrid or other techniques.

Figure 3A:
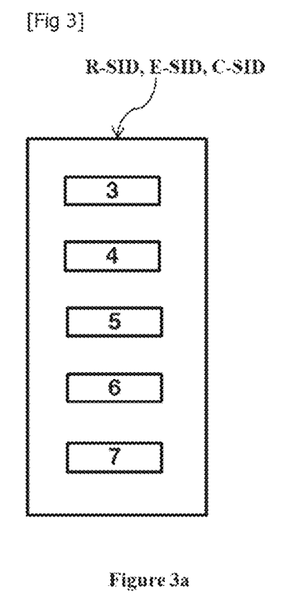
FIGS. 3A and 3B show schematically the functional architectures of two intrusion detection modules SID and C-SID* used for protecting different segments of the network of FIG. 2.

In the embodiment described here, it is considered, as shown in FIG. 3A, that each SID module comprises:

a data collection submodule 3, configured to collect various features of the traffic flowing through the elements monitored by the SID module;

an anomaly detection submodule 4, configured to detect, on the basis of the data collected by the collection submodule 3, an anomaly in the behavior of the monitored elements, for example by comparison with a model of the normal behavior of these elements (i.e. in the absence of intrusion). An anomaly consists, for example, of an abnormal number of lost packets, the flooding of the network 1 with undesired and repeated data, alterations of sensitive data, an interrupted communication, a noncompliance with a latency set for a segment of the network, etc.; and a deep analysis submodule 5, configured to use, for example, a machine learning algorithm or a detection algorithm based on known intrusion signatures (reflecting traffic features symptomatic of these intrusions, for example), or alternatively a hybrid algorithm, to analyze an anomaly detected by the anomaly detection submodule 4 and to determine whether or not this anomaly is linked to the presence of an intrusion.

For each network slice $SL_i$, i=1, . . . , N using the infrastructure of the network 1, where N denotes an integer (8 in the example shown in FIG. 2), the invention proposes the deployment of a plurality of intrusion detection modules $SID(SL_i)$ in a distributed manner within this infrastructure. The detection modules associated with the slice $SL_i$ (that is to say, deployed to ensure the security of the slice $SL_i$) are denoted in the remainder of the description by $SID_j(SL_i)$, where j=1, . . . , $K(SL_i)$, and where $K(SL_i)$ denotes an integer that may vary from one network slice $SL_i$ to another. For the sake of simplicity, it is assumed here that the same number K of detection modules is deployed for each slice, or in other words $K(SL_i)$=K for every i=1, . . . , N.

The detection modules $SID_j(SL_i)$ with j=1, . . . , K associated with each slice $SL_i$ are deployed here at three levels of the infrastructure of the network 1, for monitoring elements belonging to different segments of the network 1, as follows:

at the level of the access network(s) RAN (at the level of base stations of the access network(s), for example) used by the slice $SL_i$: the modules are then denoted in a general way by R-SID in FIG. 2, standing for "Radio-SID" (or $R-SID_j(SL_i)$ for a slice $SL_i$), and are responsible for monitoring the different elements involved in wireless communications;

at the level of the edge network MEC used by the slice $SL_i$: the modules are then denoted in a general way by E-SID in FIG. 2, standing for "Edge-SID" (or $E-SID_j(SL_i)$ for a slice $SL_i$), and are responsible here for protecting the edge servers from attacks; and at the level of the core network CN of the network 1: the modules are then denoted by C-SID in FIG. 2, for "Core-SID" 2 (or $C-SID_j(SL_i)$ for a slice $SL_i$), and are responsible here for protecting the main components of the core network CN, and notably the virtual network functions AMF, SMF, PCF and UPF.

It should be noted that there is no limit on the kind of elements monitored in each of the aforesaid network segments (access network, edge network, core network) by the detection modules SID: these elements may be any resource or set of resources belonging to or deployed in these network segments (such as user equipments, servers, networks, cells, memory, network or calculation resources, data, etc.).

Furthermore, there is no limit on the kind of equipment in which the detection modules SID are deployed (server, data center, base station, etc.). These pieces of equipment have the hardware architecture of a computer and comprise, notably, a processor, a random access memory, a read-only memory, a non-volatile memory and means of communication enabling them to support communication, notably between detection modules SID. The read-only memory of such equipment in which a detection module SID is deployed is a data medium on which is recorded a computer program readable by the processor and having instructions for the execution of the various functions provided by this detection module SID.

In the embodiment described here, horizontal upward and downward collaboration within each network slice SLi is implemented between the modules SID deployed at all three of the aforesaid levels. More particularly, in each network slice SLi, the R-SID(SLi) modules cause information to be uploaded to the E-SID(SLi) modules, which, in turn, upload information to the C-SID(SLi) modules (upward horizontal collaboration, or uplink). Such information relates, notably, to intrusions (attacks) and/or anomalies detected by the modules SID, the location of the targets of these intrusions or elements affected by them, the instants at which these intrusions were detected, the features (or attributes) of these intrusions, etc.

Because of this horizontal collaboration, the R-SID, E-SID and C-SID modules are also configured to monitor the information uploaded to them, and to use this information advantageously in the detection that they carry out. Typically, a C-SID module may, for example, analyze the features of the attacks detected by the E-SID modules that are uploaded to it, in order to check whether attacks are taking place against the latter. Since the C-SID module has visibility of a plurality of E-SID modules, it may be able to detect precisely whether some of these are malicious and/or targeted by attacks.

This "upward" horizontal collaboration (from the access network to the core network) may be accompanied by a "downward" horizontal collaboration, in which a C-SID module informed of an intrusion detected by an E-SID or R-SID module confirms or negates the presence of this intrusion (in other words, validates the detection carried out by the E-SID or R-SID module as either positive or negative), and notifies its decision to the E-SID or R-SID module to enable it to improve its detections and, as detailed further below, to adapt certain operating parameters. It should be noted that a C-SID module may, in a particular embodiment, request a trusted authority such as a Security Operations Center (SOC, not shown in FIG. 2) to validate its detections and to transmit the decisions of the SOC to the E-SID and R-SID modules reporting to it.

There is no limit on the number of SID modules deployed in each segment of each network slice (access network, edge network, and core network). In the remainder of the description, it is assumed for the sake of simplicity that, for example, for a given network slice a single R-SID module is deployed at the level of each access network, a single E-SID module is deployed at the level of each edge network, and that a plurality of C-SIDs are deployed at the level of the core network to monitor one or more separate active network functions of the core network.

It should be noted that the same SID module may monitor and/or protect one or more network slices simultaneously, and/or one or more elements. Thus, in the example illustrated in FIG. 2, an R-SID module is deployed at the level of each base station (eNodeB) of the four access networks used by the network slices SL1-SL2, SL3-SL4, SL5-SL6 and SL7-SL8 respectively, and each R-SID module thus deployed is configured to monitor a single network slice. For example, the R-SID module monitors the base station at which it is deployed; it may also be configured to additionally monitor the base station eNode B, the various user equipments attached to this base station, and/or the nodes of the network 1 communicating with it;

an E-SID module is deployed at the level of each of the two edge networks used by slices SL1 to SL4 and SL5 to SL8 respectively, to monitor four network slices simultaneously. For example, the E-SID module is configured to monitor the various nodes (server, storage areas, etc.) of the edge network at the level of which it is deployed; and a C-SID module is deployed at the level of the AMF function of the core network and used to monitor the eight network slices SL1-SL8 simultaneously, while other C-SID modules are configured to monitor, respectively, two or three network slices and a plurality of network functions simultaneously (that is to say, the functions SMF, PCF and UPF in the example of FIG. 2).

In the embodiment described here, each detection module SID is configured to execute one or more actions during the monitoring that it carries out. Thus, in addition to the action of monitoring the data collected by the collection submodule 3, the action of deep analysis by the submodule 5 of the anomalies detected during this monitoring, and the action of notification (or transmission of alerts to signal detected intrusions), which are common to each of the detection modules SID, these actions may comprise, for example, an action of aggregation and/or correlation of the information received, where relevant, from another detection module SID, an action of intrusion mitigation (or reaction to an intrusion), etc. This list is given for guidance only and is not in any way limiting or exhaustive.

These actions are "logical" actions implemented by software, in the embodiment described here. They may be configured and instantiated at the level of each detection module SID by a cyber security expert, so as to be executed automatically by said detection module SID. The choice of the action(s) to be implemented at the level of each SID module may depend on various factors such as the segment of the network on which the SID module is deployed, the parameters to be optimized, etc.

In the embodiment described here, the actions chosen for each SID module differ according to the network segment where it is deployed. More particularly, the R-SID detection modules are configured to execute actions for monitoring and anomaly detection, deep analysis of the anomalies detected, and notification of detected intrusions, if relevant, to other SID detection modules; the E-SID and C-SID detection modules are configured to execute, in addition to the aforesaid actions, actions of aggregating and/or correlating the information on the intrusions notified to them, where relevant, before transmitting it to another detection module, and intrusion mitigation.

These different actions are defined as follows:
the monitoring and anomaly detection actions consist of collecting (by means of submodule 3 shown in FIG. 3A) various predefined data concerning the traffic flowing through the monitored elements, and determining (by means of submodule 4 shown in FIG. 3A) whether or not the data collected by the collection submodule 3 give rise to a suspicion of an anomaly;
the action of deep analysis consists in the application (by means of submodule 5 shown previously in FIG. 3A) of a machine learning algorithm for analyzing in depth the data representative of an anomaly and determining whether or not this anomaly is due to an intrusion. As mentioned above, there is no limit on the technique used; it may be, for example, a supervised or unsupervised learning algorithm, a neural network, a support vector machine, etc.;

the action of notification consists in sending alert(s), typically to another SID module, if an intrusion has been detected by the SID module. The notification may be made in a horizontal manner, as discussed above, that is to say within the same network slice (for example, an R-SID module notifies an E-SID module associated with the same slice, or an E-SID module notifies a C-SID module associated with the same slice, or alternatively a C-SID module notifies the R-SID and E-SID modules associated with the same slice), or in a vertical manner, for example between R-SID modules associated with different network slices using the same access network. This alert may contain various pieces of information on the detected intrusion, such as the number of targets and the suspected targets of this intrusion (e.g. their location), the instant of detection of the intrusion, the features of this intrusion (that is to say, the attributes considered to have led to the detection of the intrusion), etc. The main aim of this action is to enable the various SID modules to share their information on the detected intrusions, and thus to ensure, notably, that the E-SID and C-SID modules have a knowledge of the intrusions detected in the network slice. This enables the precision of detection of these modules to be improved dynamically;

the action of aggregation and/or correlation consists in collecting and aggregating the notified alerts and, by correlating these alerts with each other, deleting the redundant information. In this operation, the SID detection module compresses to a certain extent the information to be transmitted to the other SID detection modules. This limits the amount of information uploaded to the C-SID modules (and thus the associated signaling (or "overhead")), and the process of intrusion detection and mitigation of the detected intrusions, where relevant, is accelerated;

the action of intrusion mitigation consists in triggering one or more reactions for processing or eliminating the detected intrusion, or at least for rendering it inoperative in the network 1. These reactions may depend on the network segment to which the mitigation action is applied. Thus, for example, at the level of an E-SID module, it would be feasible to isolate or exclude from the network 1 the elements targeted by the intrusion and located at the level of the access network or the edge network (such as user equipments or MEC servers), so that these elements can no longer be included in a communication or a service offered by the communications network 1. At the level of a C-SID module, the mitigation action may consist in isolation (i.e. suppression or inactivation) of the network slice targeted by the intrusion, and the establishment of a blacklist referencing the elements targeted by the intrusion and located at the level of the access network(s), the edge network(s), and/or the core network used by the infected slice. A decision to isolate a network slice may be taken, notably, by taking into account an estimated global confidence index for this slice, as further detailed below.

Evidently, other actions may be envisaged at the level of each SID detection module.

In the embodiment described here, the activation (i.e. execution) at the level of a SID detection module of some or all of the actions that it is capable of executing takes place automatically when the SID detection module in question detects, via an activation submodule 6 (see FIG. 3A), that a probability of executing these actions is above a specified (i.e. given) threshold. This mechanism offers the possibility of parameterizing the system and enables the resources of the detection module to be preserved while effectively ensuring the security of the network segment that it monitors. It should be noted that, in the embodiment described here, each SID detection module concerned is configured for continuously executing monitoring and anomaly detection actions as described above.

Depending on the nature of the action and/or the SID detection module and/or the type of SID detection module (R-SID, E-SID or C-SID) concerned, a different threshold may be envisaged. For example, if $p_{deep}(x)$, $p_{agregco}(x)$, $p_{notif}(x)$, $p_{mitig}(x)$ denote, respectively, the probabilities of executing a deep analysis action, an aggregation and/or correlation action, a notification action and a mitigation action at the level of an SID detection module indicated by x (where x denotes an R-SID, E-SID or C-SID module), these actions are triggered and executed by the SID detection module respectively if:

$p_{deep}(x) > TH_{deep}(x)$
$P_{agregco}(x) > TH_{agregco}(x)$
$P_{notif}(x) > TH_{notif}(x)$
$P_{mitig}(x) > TH_{mitig}(x)$ where $TH_{deep}(x)$, $TH_{agregco}(x)$, $TH_{notif}(x)$ and $TH_{mitig}(x)$ denote the thresholds set for each of the deep analysis, aggregation and/or correlation, notification and mitigation actions respectively.

It should be noted that it would be feasible, in the same network segment, for different thresholds to apply to the different detection modules deployed for monitoring this network segment. Different thresholds may also be defined for each network slice concerned.

In the embodiment described here, the probabilities $p_{deep}(x)$, $p_{agregco}(x)$, $p_{notif}(x)$, $p_{mitig}(x)$ are calculated periodically by the activation submodule 6 of the SID detection module concerned, in the following manner. In a variant, they may be calculated on the detection of particular events (such as an intrusion detected by a detection module of another slice of the network, information received from the security operations center, etc.).

At the level of any SID detection module (R-SID, E-SID, C-SID), the probability $p_{deep}(x)$ is evaluated as the ratio of the number of intrusions ND detected by the SID detection module to the total number NA of intrusions detected in the network slice concerned. The total number of intrusions detected in the network slice corresponds to the intrusions confirmed by the core network (i.e. by a C-SID module) for the R-SID and E-SID modules, or by the SOC for the C-SID modules. It should be noted that the core network and the SOC, having a greater visibility of the network 1 and therefore of each network slice, and benefiting from the information uploaded by the various SID detection modules deployed in the different segments of the network, have a greater precision of detection, and therefore it may be hypothesized that NA≥ND.

At the level of an E-SID module, respectively of a C-SID module, respectively, the probability $p_{agregco}(X)$ is evaluated as the ratio of the number of intrusions detected at the level of the access network for the network slice in question by the R-SID module(s) and notified to the E-SID module, respectively at the level of the edge network(s) by the E-SID module(s) and notified to the C-SID module, to the total number of intrusions detected at the level of the edge network for the network slice concerned by the E-SID module, respectively at the level of the core network by the C-SID module. Here again it should be noted that the E-SID module, respectively the C-SID module, is assumed to have a greater precision of detection than the R-SID module, respectively the E-SID module, so that the ratios calculated in this way are indeed below or equal to 1.

At the level of an R-SID detection module, the probability $p_{notif}(x)$ is evaluated here in an identical manner to the probability $p_{deep}(x)$, i.e. $p_{notif}(x)=p_{deep}(x)$.

At the level of the E-SID and C-SID modules, the probabilities $p_{notif}(x)$ and $p_{mitig}(x)$ are calculated as the ratio of the probability $p_{desp}(x)$ and the probability $p_{agregco}(x)$.

Evidently, other procedures or rules may be followed to determine the probabilities $p_{deep}(x)$, $p_{agregco}(x)$, $p_{notif}(x)$, and $p_{mitig}(x)$. For example, when a neighboring SID detection module (in the sense that it has connectivity with the SID module concerned), belonging to the same network slice or to the same access network, signals the detection of an intrusion to the SID detection module, it may decide to force the value of the probability $p_{deep}(x)$ to 1. Other rules may be considered by way of variants. Each threshold with which a probability of triggering a given action is compared may be set in a static way, by cyber security experts for example. It should be noted that a threshold set at 0 is equivalent to no condition set on the execution of the action concerned; in other words, the action is executed in all cases as soon as it becomes relevant (a notification sent when an intrusion is detected, or a deep analysis, for example). These thresholds may be set so as to optimize the resources of the network 1 (such as the "overheads" for notifications, calculation resources, the load on the network, etc.).

In a variant, each threshold may be determined dynamically by and for the SID detection module concerned (by its activation submodule 6, for example) as a function of miscellaneous parameters, and notably the number of false detections performed by this module. Other parameters may be considered, such as the number of intrusions detected or the number of cyber attackers, the network elements or segment monitored by the SID detection module, the type of intrusions detected, etc. This dynamic updating of the thresholds makes it possible to adapt to the changing environment of cyber intrusions, and notably to detect new intrusions.

In order to update a threshold dynamically, the SID detection module may use a machine learning algorithm such as a recursive algorithm for learning by reinforcement, also commonly referred to as a Q-learning algorithm, which is known to those skilled in the art. Evidently, other algorithms may be used, such as an SVM (Support Vector Machine) algorithm, etc.

In the embodiment described here, it is assumed that all the thresholds associated with actions executed by an SID detection module are updated dynamically and jointly by means of the machine learning algorithm. This joint updating makes use of the effect of the horizontal collaboration implemented by the SID detection modules on the detections that they perform, and the correlation between the various actions that the SID detection modules can execute.

For example, if numerous anomalies are detected by the E-SID module, it must be capable of analyzing all these anomalies, must effectively aggregate the information that it uploads to a C-SID module (typically by uploading all the information on the intrusions that they detect if these intrusions are numerous, or spacing apart the information uploads if the intrusions are non-existent or rare at the edge network level), must react rapidly by triggering mitigation actions, and must rapidly notify the C-SID detection modules to which it reports. In other words, the thresholds associated with the actions of deep analysis, notification, mitigation and aggregation must be close to 0.

This joint updating of the thresholds thus enables a compromise to be achieved between the precision of the detections performed by the detection modules and the quality of the service provided by the network slice where they are deployed (in terms of overheads, latency, etc.).

In a variant, individual determination of each of the thresholds may be envisaged.

More particularly, the initial values of the thresholds $TH_{deep}(x)$, $TH_{agregco}(x)$, $TH_{notif}(x)$ and $TH_{mitig}(x)$ may be set by cyber security experts or may be considered to be equal to any value, for example 0.5.

The SID detection module concerned then applies the Q-learning algorithm to update the threshold values recursively and jointly. For this purpose, it is based here on a "utility" function denoted U, evaluated at each iteration t of the algorithm and defined by:

$$U(t) = \frac{ND(t) - (NP(t) + NN(t))}{NA(t)} \qquad \text{(Eq. 1)}$$

where ND(t) is the number of intrusions detected correctly at the iteration t by the SID detection module, NP(t) is the number of false positives detected by the SID detection module at the iteration t (i.e. the number of anomalies classed as intrusions by the SID detection module even though the behavior was normal), NN(t) is the number of false negatives detected by the SID detection module at the iteration t (i.e. the number of anomalies classed as normal behavior by the SID detection module even though intrusions were present), and NA(t) is the number of total intrusions affecting the relevant slice of the network 1 at the iteration t. This number NA(t) may be estimated by the security operations center or by the core network, which have an overall view of the network, and may be supplied by the latter to the SID detection module (regularly, for example). It should be noted that the numbers of false positives and false negatives are determined with reference to the results of the aforementioned validations, carried out on the detections performed by the SID detection module (e.g. the validation performed by the C-SID module for an R-SID or E-SID module, and by the SOC for a C-SID module).

At each iteration t, if the current values of the thresholds are not all zero, the SID module calculates the utility value U(t) for the iteration t and compares it with the utility value calculated at the preceding iteration t-1.

On the basis of the result of the comparison, it then updates a reward value denoted R(t), initialized to 0. The reward value is incremented here by 1 when U(t)>U(t-1); otherwise it is decremented by 1.

The neural network of the Q-learning algorithm is then activated for the joint calculation of new threshold values $TH_{deep}(x)$, $TH_{agregco}(x)$, $TH_{notif}(x)$ and $TH_{mitig}(x)$ (or only some of these values, depending on the actions executed by the SID module concerned), by providing it with inputs in the form of the current threshold values, the number of intrusions detected in the segment monitored by the SID detection module, the elements monitored by the latter, the type of intrusions detected, and the current reward value R(t) that has just been updated.

The new threshold values calculated in this way are supplied to and used by the deep analysis module 5. If a new type of intrusion is detected with these new threshold values, then the SID module again increments the reward value R(t) by 1. Otherwise it decrements said reward value by 1.

It should be noted that, in the embodiment described here, the value of the reward R(t) may advantageously be incremented twice in one iteration: a first time because the utility function is better than at the preceding iteration following the update of the thresholds, and a second time because the update of the thresholds makes it possible to detect intrusions of a new type that could not be detected before.

The steps of the Q-learning algorithm described above are iterated until the ratio ND(t)/NA(t) converges toward 1, as summarized in Table 1 below for a combined update of all the thresholds $TH_{deep}(x)$, $TH_{agregco}(x)$, $TH_{notif}(x)$ and $TH_{mitig}(x)$ (those skilled in the art could easily adapt these steps to an update of only some of these thresholds).

TABLE 1

Start t=0; $R_t$=$U_t$=0
Repeat :
  increment t;
  if ($TH_{deep}(x)$, $TH_{agregco}(x)$, $TH_{notif}(x)$,$TH_{mitig}(x)$)≠(0,0,0,0)
    calculate $U_t$;
  if $U_t$>$U_{t-1}$
    then $R_t$=$R_{t-1}$+1;
  otherwise
    $R_t$=$R_{t-1}$−1;
  Estimate new values of $TH_{deep}(x)$, $TH_{agregco}(x)$, $TH_{notif}(x)$,$TH_{mitig}(x)$ using $R_t$ ;
  Execute deep analysis using the new values of $TH_{deep}(x)$, $TH_{agregco}(x)$, $TH_{notif}(x)$,$TH_{mitig}(x)$ ;
  if a new type of intrusion is detected:
    $R_t$=$R_{t-1}$+1;
  otherwise
    $R_t$=$R_{t-1}$−1;
Until ND(t)/NA(t)→1

It may also be envisaged that some thresholds are set statically and others are set dynamically.

Figure 4:
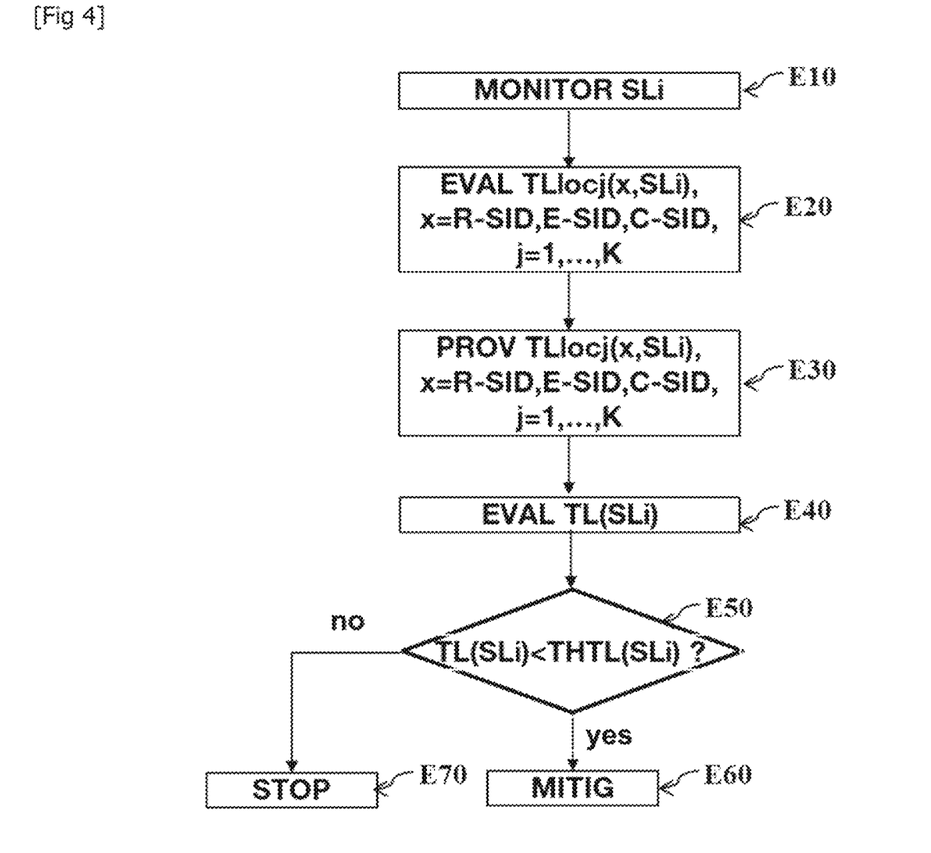
FIG. 4 shows, in the form of a flow chart, the main steps of a monitoring method according to the invention, in a particular embodiment in which it is implemented by intrusion detection modules of the network of FIG. 2.

With reference to FIG. 4, according to the invention, the monitoring system 2 is configured to evaluate a global confidence index for each network slice SLi, i=1, . . . , N, by applying the monitoring method according to the invention. FIG. 4 shows the main steps of such a method, as implemented in a particular embodiment by the monitoring system 2.

More particularly, according to the invention, each detection module SIDj(SLi) associated with (or deployed for monitoring the elements attached to) a network slice SLi comprises, as well as the submodules 3 to 6 described above, an evaluation submodule 7 (see FIG. 3A), configured to evaluate, during the monitoring of the elements attached to the detection module SIDj(SLI) (step E10), a piece of information TLlocj(x,SLi) which in this case is between 0 and 1 and is representative of a local confidence level assigned to this network slice, where x indicates, as before, whether the detection module SIDj(SLi) concerned is an R-SID, E-SID or C-SID module.

This piece of information measures the confidence of the detection module SIDj(SLi) in the elements that it monitors, this confidence being determined on the basis of the behavior of these elements, observed by the detection module SIDj(SLi) (notably via its monitoring submodule 4). More specifically, in the embodiment described here, the piece of information (or more simply the local confidence level) TLlocj(x,SLi) is evaluated in the following manner by the evaluation submodule 7 of the detection module SIDj(SLi) (step E20):

$$TLlocj(x,SLi)=(BOK-BNOK)/(BOK+BNOK)$$

where BNOK denotes the number of intrusions detected over a period of time T determined by the detection module SIDj(SLi) and affecting the elements that it monitors, BOK denotes the number of "normal" behaviors observed by the detection module SIDj(SLi) in the elements that it monitors over the period T. The normality or abnormality of a behavior of a monitored element may be estimated on the basis of predefined criteria or models of normal behavior such as those used by the anomaly detection submodule 4. It should be noted that the difference BOK-BNOK is here assumed to be positive. If this is not the case, the value of the confidence index is forced to 0.

Thus, if the elements monitored by a detection module SIDj(SLi) persist in exhibiting behavior judged to be "abnormal" (arousing suspicions of an intrusion), the local confidence index TLlocj(x,SLi) tends toward 0. Conversely, if normal behaviors are observed, the local confidence index TLlocj(x,SLi) tends toward 1. It should be noted that the local confidence index TLlocj(x,SLi) is obtained by considering all the elements monitored by the detection module SIDj(SLi) (in other words, the mean of the confidence indices associated individually with each element monitored is done).

Evidently, other ways of estimating a local confidence index may be envisaged in the context of the invention, such as a weighted sum of the numbers BOK and BNOK, only one of these two numbers, or any other function of these two numbers, etc.

As mentioned above, a local confidence level is evaluated by each detection module SIDj(SLi) deployed in the network slice SLi: in other words, each module R-SIDj(SLi), each module E-SIDj(SLi) and each module C-SIDj(SLi) deployed in the network slice SLi evaluate a local confidence index, taking into account the behavior of the elements that they respectively monitor. The local confidence indices evaluated in this way for the network slice SLi are then supplied to a detection module C-SID*(SLi) deployed at the core network level (step E30) for the network slice SLi. In the embodiment described here, it is assumed that this supply is made in a secure manner, for example by encrypting the messages comprising the local confidence indices; this encryption may be based, notably, on a robust and lightweight cryptography protocol such as that described in the paper by J. Ni et al., entitled "Efficient, Secure and Privacy-preserving Network Slicing for 5G-enabled IoT Systems", IEEE Journal on Selected Areas in Communications, vol. 36, issue 3, 2018.

Figure 3B:
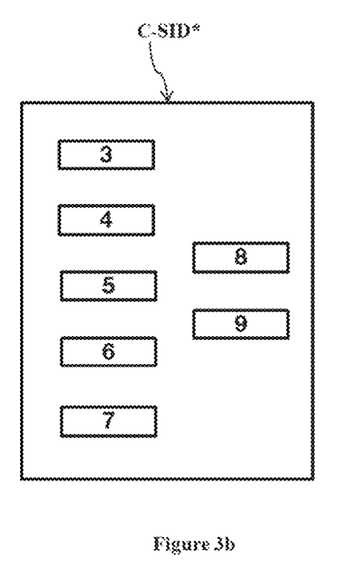

In the embodiment described here, the detection module C-SID*(SLi) comprises, in addition to the submodules 3 to 7 described above, a second evaluation submodule 8, together with a mitigation submodule 9 (see FIG. 3B). The second evaluation submodule 8 is configured to evaluate a global confidence index for the network slice SLi, having a value of between 0 and 1 here, on the basis of the information representative of the local confidence indices supplied by the set of detection modules SIDj(SLi). More particularly, in the embodiment described here, the global confidence index TL(SLi) for the network slice SLi is evaluated by the submodule 8 of the detection module C-SID*(SLi) as the mean of the local confidence indices supplied by all the modules SIDj(SLi) associated with the slice SLi (step E40).

In a variant, the global confidence index may be evaluated using a function other than the mean of the local confidence indices, such as a standard deviation of the local confidence indices, a weighted sum with a higher weight given to the local confidence indices estimated by the C-SID modules that have a more overall view of the network, etc.

It should be noted that the local confidence indices evaluated by the R-SID modules may be collected by the E-SID modules linked with the R-SID modules, and then supplied by the R-SID modules to a C-SID module, which itself is connected to the C-SID* module. In a variant, direct communication between the R-SID and E-SID modules and the C-SID* module may be envisaged.

Here, the module C-SID*(SLi) is one of the detection modules C-SID(SLi) deployed in the core network, responsible for monitoring one or more network functions activated for the network slice SLi. In the embodiment described here, the module that is chosen as the C-SID*(SLi) module is a C-SID detection module deployed in the network core as near as possible to the edge network(s) and the access network(s), for example the C-SID module responsible for monitoring the network function AMF (corresponding to the "first" active function of the core network called on for access to the service provided by the network slice SLi). In a variant, the chosen module may be the C-SID detection module responsible for monitoring another network function such as the UPF function. It should be noted that, for the calculation of the global confidence index, the chosen module C-SID*(SLi) also takes its own local confidence index into account.

When the global confidence index has been evaluated, the module C-SID*(SLi) determines, using its mitigation submodule 9, whether a mitigation action should be triggered in view of the value of this index (test step E50). For this purpose, it compares the evaluated global confidence index TL(SLi) with a given threshold, here denoted THTL(SLi). This threshold may vary from one network slice to another (being higher for the network slices requiring enhanced security, for example), may be the same for all the network slices, or may depend on the service offered in the network slice, etc. It may be set by a cyber security expert for each of the network slices concerned, and may be parameterizable and change over time. For example, this threshold may be set at 0.8.

Given the convention used here, if the evaluated global confidence index TL(SLi) here is below the threshold THTL(SLi) defined for this slice (the answer to the test step E50 being "yes"), then the mitigation submodule 9 triggers an intrusion mitigation action for the network slice SLi (step E60). Different types of mitigation action may be triggered: for example, the module C-SID*(SLi) may decide to isolate (i.e. suppress or disable) the network slice SLi, notably if the global confidence index is below a low threshold (e.g. 0.3), or to isolate a network segment on which the network slice SLi is based, or to identify in a blacklist certain elements associated with this network slice that are considered malicious (for this purpose, the module C-SID*(SLi) may make use of the information uploaded by the various SID(SLi) modules deployed to monitor the network slice in order to identify such elements and/or the actions to be taken), so that the traffic to or from these malicious elements can be blocked, or to inform the security operations center SOC which may decide on mitigation actions to be performed in the network 1, etc. It should be noted that the mitigation action that is triggered may also vary according to the value of the global confidence index TL(SLi); similarly, the mitigation action may be decided by the module C-SID*(SLi) by analyzing the local confidence indices to determine where this action is to be taken or what action is to be taken.

If the evaluated global confidence index TL(SLi) is above the threshold THTL(SLi) (the answer to the test step E50 being "no"), no mitigation action is taken (step E70). The module C-SID*(SLi) may notify this to the other SID(SLi) modules associated with the slice SLi, notably those that have produced low local confidence indices, and may send them information to enable them to update the attributes used by the detection techniques, for example.

It should be noted that other approaches may be envisaged for evaluating the local and global confidence indices associated with a network slice. For example, an approach such as that described in the paper by B. Niu et al., entitled "5G Network Slice Security Trust Degree Calculation Model", 3rd IEEE International Conference on Computer and Communications, Chengdu, China, 2017, pp. 1150-1157, may be used by way of variant.

Thus the invention proposes a solution that enables security to be guaranteed from end to end of network slices, based on a hybrid calculation technique combining a distributed calculation of local confidence indices with a centralized calculation of a global confidence index for each slice of the network. This makes the calculated global index more robust and allows, if necessary, a mitigation action adapted to each network slice concerned.

The invention claimed is:

1. A monitoring system for monitoring at least one slice of a communications network using at least one access network, an edge network and a core network, said system comprising, for each slice:
   a plurality of intrusion detection modules configured to monitor elements associated with said slice and comprising at least:
      a first module for detecting intrusions at the access network level,
      a second module for detecting intrusions at the edge network level, and
      at least one third module at the core network level, each of said modules being configured to provide a piece of information representative of a local confidence level assigned to said slice according to a behavior of at least one element that it monitors, said at least one third module also being configured to evaluate, from said information provided, a global confidence level for said slice and to trigger an intrusion mitigation action for said slice according to a value of said global confidence level.

2. The system of claim 1, wherein said plurality of detection modules associated with said slice comprises a plurality of third modules associated, respectively, with separate active network functions of the core network.

3. The system of claim 2, wherein said at least one third module configured to evaluate the global confidence level is selected from among said plurality of third modules on the basis of its proximity to the access network and/or to the edge network.

4. The system of claim 1, wherein the global confidence level for said slice is a mean of local confidence levels provided by said plurality of detection modules.

5. The system of claim 1, wherein at least one local confidence level is evaluated by a said detection module for said slice as a ratio between a subtraction of a number of normal behaviors of said at least one element monitored by this detection module and of a number of intrusions affecting said at least one element monitored by this detection module detected over a given period of time, by a sum of said numbers.

6. The system of claim 1, wherein said intrusion mitigation action comprises, if the value of the global confidence level is below a given threshold, the isolation of said slice of the network and/or the removal of at least one element of the access network, of the edge network and/or of the core network identified as being targeted by an intrusion.

7. The system of claim 1, wherein said first module is configured so that, on detecting an intrusion, it signals said detected intrusion to said second module and/or to said first module associated with another slice using said access network.

8. The system of claim 1, wherein said second module is configured so that, on detecting an intrusion, it signals said detected intrusion to said at least one third module and/or triggers a mitigation action at the level of the access network and/or of the edge network.

9. The system of claim 1, wherein at least one said detection module is configured to execute at least one action from among a deep analysis action, a notification action, and/or a mitigation action when it detects that a probability of executing this action is above a specified threshold.

10. The system of claim 9, wherein said threshold is determined dynamically for said detection module on the basis of a number of false detections performed by said detection module.

11. A communications network configured to implement network slicing, said communications network comprising the system of claim 1, configured for monitoring at least one slice of said network.

12. A method for monitoring at least one slice of a communications network using at least an access network, an edge network and a core network, said method comprising:

monitoring said slice by means of a plurality of intrusion detection modules configured to monitor elements associated with said slice and comprising at least a first module for detecting intrusions at the access network level, a second module for detecting intrusions at the edge network level, and at least one third module at the core network level;

providing, by means of each of said plurality of intrusion detection modules, a piece of information representative of a local confidence level assigned to said slice according to a behavior of at least one element monitored by said module;

evaluating, by means of said at least one third module, from said information provided, a global confidence level for said slice; and triggering an intrusion mitigation action for said slice according to a value of said global confidence level.

\* \* \* \* \*